United States Patent
Ricciardi et al.

[11] Patent Number: 5,974,132
[45] Date of Patent: Oct. 26, 1999

[54] NETWORK ARCHITECTURE FOR ROUTING OF ADJUNCT BASED SERVICES

[75] Inventors: Dominic Ricciardi, Raritan; Jerry Allen Robinson, Middleton, both of N.J.

[73] Assignee: AT&T Corp., New York, N.Y.

[21] Appl. No.: 08/970,785

[22] Filed: Nov. 14, 1997

Related U.S. Application Data

[63] Continuation of application No. 08/587,079, Jan. 4, 1996, abandoned.

[51] Int. Cl.$^6$ .............................. H04M 7/00; H04M 3/00
[52] U.S. Cl. ......................... 379/220; 379/219; 379/221; 379/225; 379/230; 379/258; 379/272; 379/273
[58] Field of Search ................................. 379/219, 220, 379/221, 225, 230, 258, 272, 273

[56] References Cited

U.S. PATENT DOCUMENTS

| | | | |
|---|---|---|---|
| 4,756,019 | 7/1988 | Szybicki | 379/112 |
| 4,991,204 | 2/1991 | Yamamoto et al. | 379/221 |
| 5,086,460 | 2/1992 | Ash et al. | 379/221 |
| 5,311,572 | 5/1994 | Friedes et al. | 379/67 |
| 5,418,844 | 5/1995 | Morrisey et al. | 379/207 |
| 5,473,679 | 12/1995 | La Porta et al. | 379/201 |
| 5,506,894 | 4/1996 | Billings et al. | 379/127 |
| 5,539,817 | 7/1996 | Wilkes | 379/230 |
| 5,583,296 | 12/1996 | Venier et al. | 379/207 |
| 5,583,920 | 12/1996 | Wheeler, Jr. | 379/88 |
| 5,712,908 | 1/1998 | Brinkman et al. | 379/119 |
| 5,768,358 | 6/1998 | Venier et al. | 379/207 |

FOREIGN PATENT DOCUMENTS

| | | | |
|---|---|---|---|
| 0630162 A2 | 6/1994 | European Pat. Off. | H04Q 3/42 |
| WO95/16321 A1 | 6/1995 | WIPO | H04M 3/42 |

*Primary Examiner*—Fan S. Tsang
*Assistant Examiner*—Allan Hoosain

[57] ABSTRACT

The present invention is a novel architecture design for adjunct based architectures. The architecture is built on two key principles; routing traffic based on geographic origin and routing based on customer group. In order to implement the geographic routing, the communications network is split into regions. A method used to achieve optimal regions is described. Further realization of the geographic routing entails a design of the architecture regions, determining the number of adjuncts/region and equally distributing the loads across the adjunct sites. Also, described is the method for optimally homing traffic between the OAS and TAS A and between TAS A and TAS B. The architecture eliminates deficiencies in prior art architectures such as intertoll focusing, architecture instability and reliability.

31 Claims, 6 Drawing Sheets

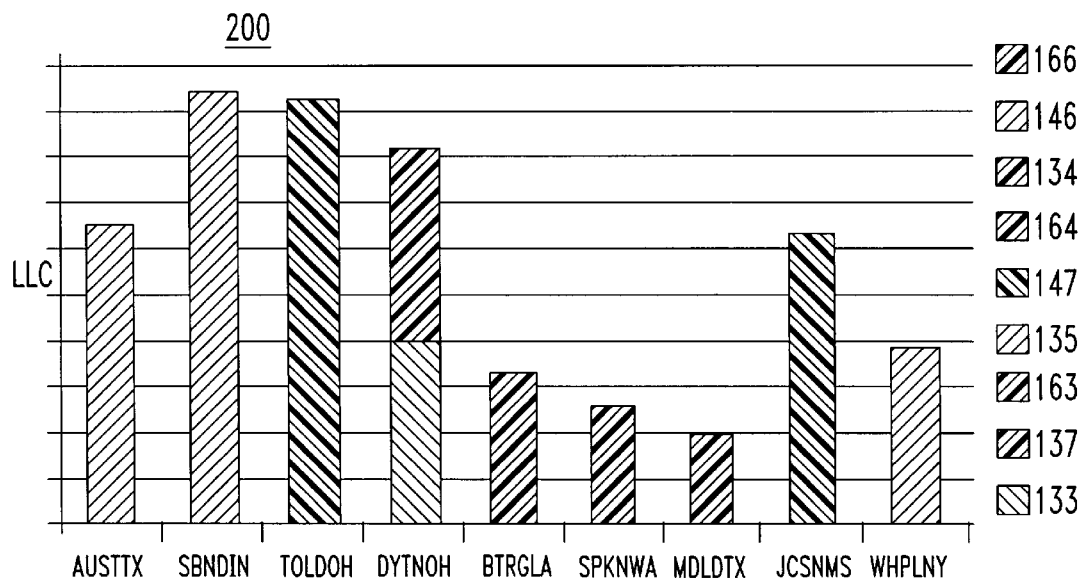
FIG. 6A
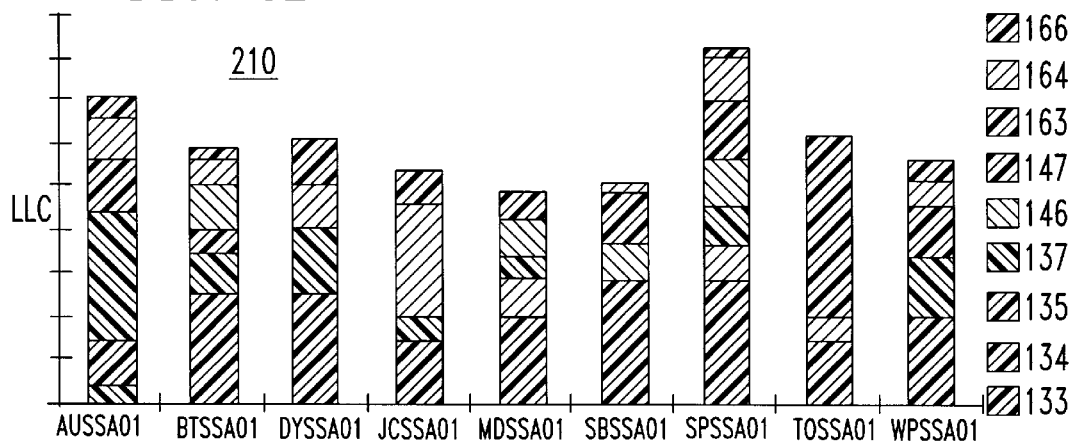
FIG. 6B
FIG. 7
| PERCENT | CALL TYPE | CALL DATA |
|---------|-----------|-----------|
| 100 | TAS A | 094 |
| 0 | TAS B | 090 |
| 0 | TAS C | 098 |
| 0 | TAS D | 099 |
| 0 | TAS E | 100 |
| 0 | TAS F | 101 |
| 0 | TAS G | 102 |
| 0 | TAS H | 103 |
| MRT TABLE (OAS) | | |

5,974,132

NETWORK ARCHITECTURE FOR ROUTING OF ADJUNCT BASED SERVICES

This is a continuation of application Ser. No. 08/587,079 filed Jan. 4, 1996, now abandoned.

FIELD OF THE INVENTION

The present invention relates generally to telecommunications networks and more particularly to an adjunct based network architecture.

BACKGROUND OF THE INVENTION

Adjunct Based Services (ABS) are services introduced on an Adjunct based architecture containing adjunct processors. An adjunct is a well known component of the Advanced Intelligent Network (AIN) Architecture. In this document, the term "Adjunct" is consistent with common usage and generally refers to a system connected to a switching system that may provide, for example, service logic, DTMF detection, and announcements. As such, the term "Adjunct" here may include the AIN Adjunct functionality and Intelligent Peripheral Functionality and the International Telecommunications Union (ITU) Services Node functionality as would be understood by a person skilled in the art. Services are typically deployed on an Adjunct based architecture to meet cost or time-to-market requirements that cannot be achieved by other architectures (for example, switch based architectures). Numerous ABS have been offered in both the consumer and business markets. An example of an ABS is the 800 Transfer Connect Service (TCS).

800 Transfer Connect Service (TCS) is an automated call routing service provided by long distance carriers for certain customers utilizing 1-800 numbers. In general, TCS provides post answer call redirection features to a caller, for example, conferencing, consultation, blind transfer, etc. Such services are invaluable to the holders of the 800 numbers, for example large corporations, in that customer calls may be directed to any one of a number of corporate locations in an extremely efficient manner. Specifically, TCS allows the called party to redirect calls to an 800 number, POTS (plain old telephone service) number, or a predefined speed dial code.

Prior art TCS systems utilized a small scale adjunct (SSA) architecture to route a specified set of customer traffic to a primary adjunct site. Each Adjunct site is assigned a Special Service Code (SSC) which is used for routing purposes; that is, there is a one-to-one relationship between SSC and adjunct site. Routing tables provide routing to a primary adjunct site and overflow sites. The routing tables, referred to as multiple routing treatment (MRT) tables, are located at the originating switch (OAS) of the long distance carrier to route calls to a specified adjunct site. Each customer to TCS is assigned an Adjunct Routing Number (ARN) in the format SSC-AAA-XXXX. Each Adjunct site is engineered to handle the capacity of a specified set of customers.

Referring to FIG. 1, there is shown an exemplary call flow for an ABS 10 utilized in the prior art. The ABS call flow is a key aspect of the ABS architecture; further aspects of the Adjunct Based Architecture will be discussed herein. As shown in FIG. 1, a caller dials a 1800-NXX-XXXX toll free call and the call is sent by the Local Exchange Carrier (LEC) 12. The LEC performs 10-digit translation of the dialed 800 toll free number to determine the appropriate telecommunications network. The LEC then passes the call to the originating switch (OAS) 14 of the appropriate telecommunications network. As would be understood, switches, such as the OAS, provide connection control for network calls in a well-known manner. Based on digit translation of the dialed 800 toll free number, the OAS signals a customer database 16 with the dialed 800 toll free number and the Automatic Number Identifier (ANI) of the caller. The database retrieves and executes the customer record. The database returns an ARN in the format SSC-AAA-XXXX to the OAS 14. Based on 3-digit translation of the ARN (SSC) at the OAS 14, the OAS points the call to the appropriate MRT Table 17, which resides in the switch, for example.

The MRT Table 17 provides routing instructions to a primary adjunct site 19 and the overflow sites. As shown in FIG. 1, the MRT Table provides the routing instructions for the switch to route the call to the primary Adjunct site 19. The MRT Table provides the Call Type equal to Destination Switch Number and the Network Switch Number NRN) equal to 094. The OAS routes the call to the terminating switch (TAS) A 18 based on the MRT Table information. The TAS A 18 translates the first 3-digits of the ARN (SSC) and points the call to another MRT Table. The MRT Table (TAS A) 15 provides the Call Type equal to Routing Data Block and the Call Data equal to 261. The MRT Table routes the call to the primary Adjunct site based on the MRT Table information. The first route chosen is the trunk sub-group to the adjunct site. If the trunk sub-group fails/busy or the primary adjunct site 19 is down, the call is cranked back to the OAS and the OAS points the call back to the MRT Table 17. The OAS then routes the call to the second route choice which provides routing instructions to the overflow adjunct site.

Referring to FIG. 2, there is shown an exemplary "partial" network architecture 20 based on the previously described TCS call flow 10. This figure effectively illustrates some key disadvantages of the prior art. Specific disadvantages include: cost effectiveness, OAS to TAS A focusing leading to intertoll blocking, TAS A to TAS B focusing leading to intertoll blocking, architecture instability under fluctuations of traffic loads, and customer perceived reliability; each of these points are considered in turn.

It is well known in traffic theory that large trunk groups more efficiently handle traffic than small trunk groups (Erlang-B distribution). The prior art ABS architecture routes all originating traffic from any OAS 14 in the network to a single TAS A 18. This routing is artificial in that large volumes of traffic flow between switches that normally support minimal traffic (e.g., the community of interest between Iowa and New York is much less than between New York and Philadelphia). As a result large amounts of traffic flow along pathways with few trunks 11. This results in large numbers of calls requiring via routing (potentially blocked); via routed calls increase Post Dial Delay and require more network resources. A similar phenomena holds for the TAS A to TAS B leg of the call. For large customers, who access the network from a TAS B geographically removed from TAS A, there will be large amounts of traffic focused on small intertoll trunk groups. The OAS–TAS A and TAS A–TAS B focusing effects result in extra cost and poor performance.

The prior art architecture is also not stable under reasonable fluctuations of customer traffic (fluctuations particularly prevalent for 800 ABS). Consider an adjunct engineered to a load of X utilization of which a large customer uses wX of the capacity. Note that wX is the total network load for the customer and that it is not uncommon for w to have a value of 0.5 or greater. If, as a result of media stimulated calling by that particular customer, the load increases to double the normal load, the adjunct would be in severe congestion (150% load). This would most likely result in network congestion, intertoll blocking and lost calls. Similarly, if a given adjunct site fails (especially in the case of a failure that evades automatic detection) all of a given customers traffic is affected.

Another disadvantage of the prior art is that for each adjunct deployed in the network a new SSC code is required. There are a finite number of SSC codes available; further growth of the prior art architecture would lead to exhaustion of these codes. Accordingly, there is a need for a more flexible network architecture that effectively supports ABS traffic.

SUMMARY OF THE INVENTION

The present invention is a novel architecture design for adjunct based architectures. The architecture is built on two key principles; routing traffic based on geographic origin and routing based on customer group. In order to implement the geographic routing, the communications network is split into regions. A method used to achieve optimal regions is described. Further realization of the geographic routing entails a design of the architecture regions, determining the number of adjuncts/region and equally distributing the loads across the adjunct sites. Also, described is the method for optimally homing traffic between the OAS and TAS A and between TAS A and TAS B. The architecture eliminates deficiencies in prior art architectures such as intertoll focusing, architecture instability and reliability.

BRIEF DESCRIPTION OF THE FIGURES

For a better understanding of the present invention, reference may be had to the following description of exemplary embodiments thereof, considered in conjunction with the accompanying drawings, in which:

FIG. 6A shows the trunk volume in hundred call seconds (CCS) vs. adjunct site based on the prior art architecture, wherein the numbers 133 through 166 represent the special service code (SSC) for each site;

FIG. 6B shows the trunk volume in hundred call seconds (CCS) vs. adjunct site based on the present invention architecture, wherein the numbers 133 through 166 represent the special service code (SSC) for each site;

FIG. 7 shows an exemplary routing table for an originating switch (OAS) according to the present invention.

DETAILED DESCRIPTION

Figure 1:
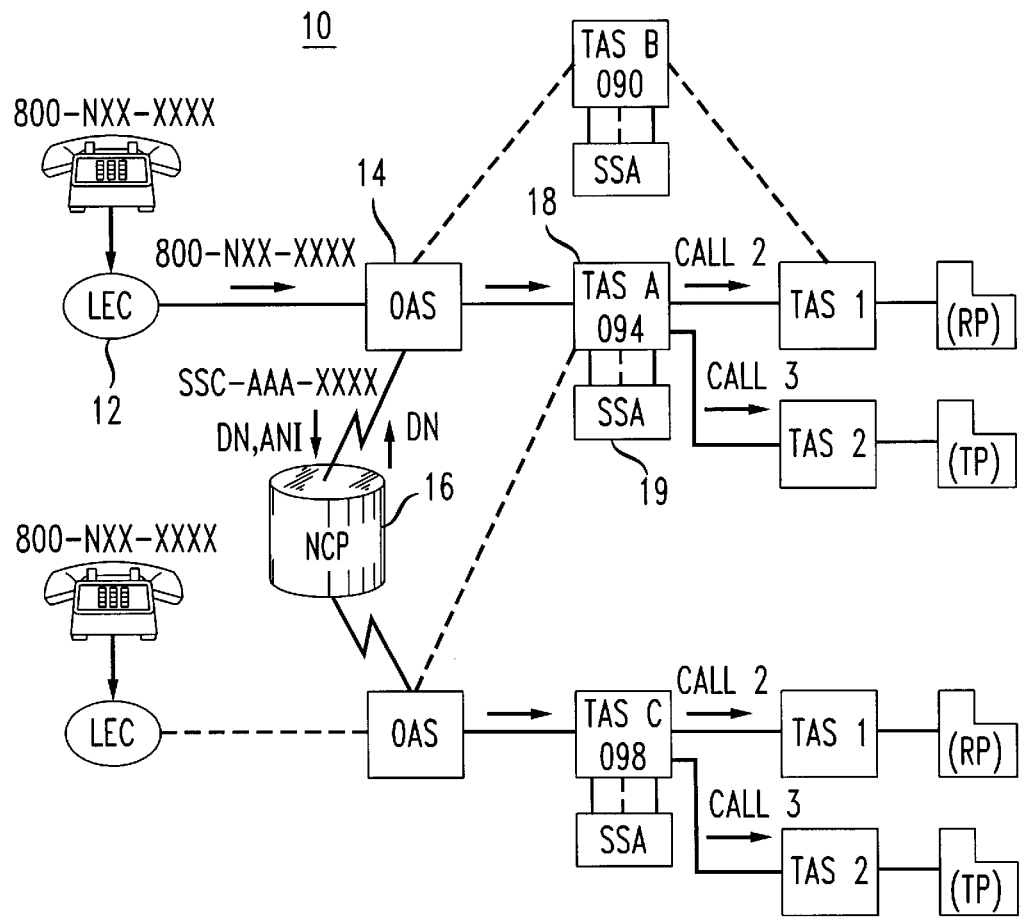
FIG. 1 shows an exemplary call flow for providing 800 TCS service according to the prior art.
Figure 2:
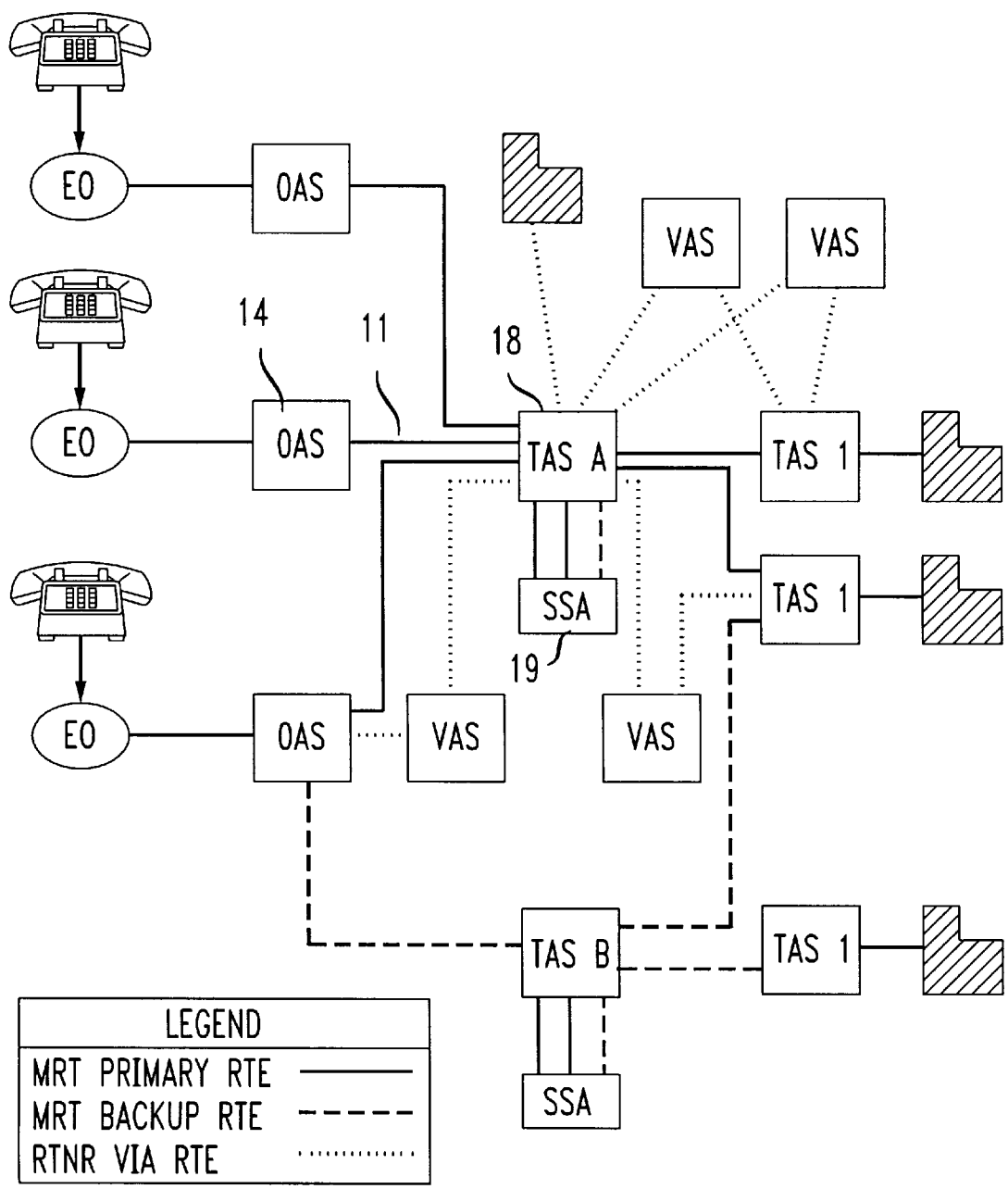
FIG. 2 shows a block diagram illustrating focusing effects of the prior art architecture.
Figure 3:
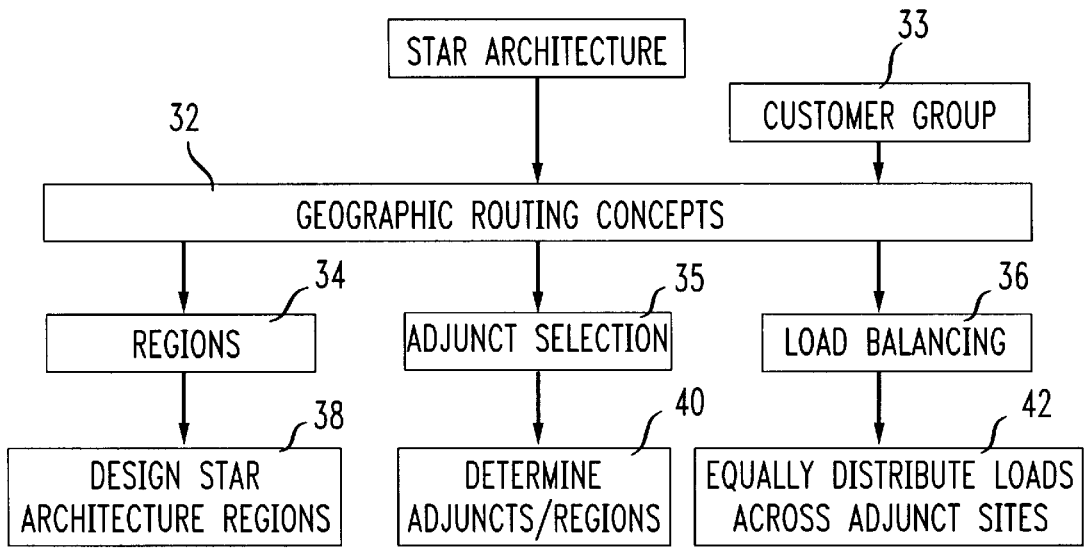
FIGS. 3–4 shows block diagrams illustrating the present invention method for routing TCS calls according to the present invention.

The present invention sets forth a novel architecture design for adjunct based architectures. The present invention architecture, also referred to as Service Traffic Adjunct Routing (STAR) architecture distributes calls to an adjunct based on geographic origin and customer group. Referring to FIG. 3, the basic methodology for the present invention routing architecture is illustrated. The STAR architecture is built on two key principles; route traffic based on geographic origin (box 32) and route based on customer group (box 33). In order to implement the geographic routing, the communications network is split into regions as shown in box 34, adjunct selections must be made for the network (box 35) and a requirement of the new network architecture is that the TCS traffic load be balanced (box 36). As shown in the next level of the flow diagram of FIG. 3, further realization of the geographic routing entails a design of the present invention architecture regions 38, determining the number of adjuncts/region 40 and equally distributing the loads across the adjunct sites 42.

Determination of Regions

Figure 4:
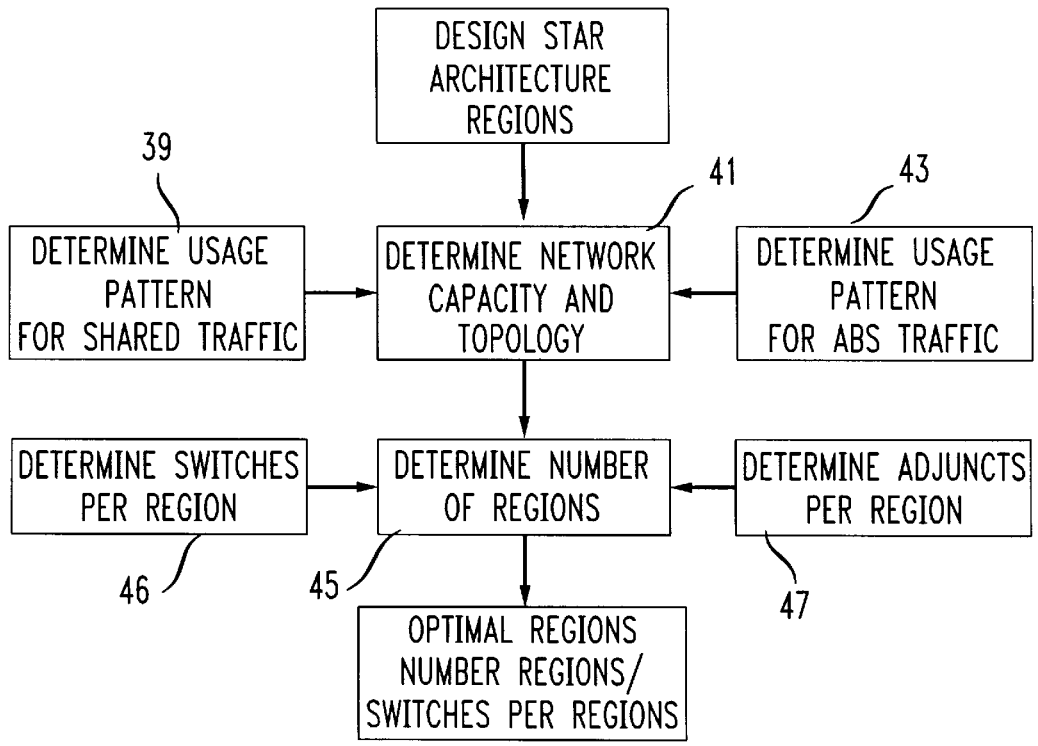

FIG. 4 illustrates the essential steps necessary to logically partition the network into regions. Adjunct Based Services are deployed as one of many services on a shared telecommunications network. As such, the first step 41 is the straightforward activity of determining the capacity and topology of the existing network. Of particular concern is the switch to switch intertoll trunking capacity which will be the focus of the following discussion. The capacity of other network resources, such as switch computing capacity (e.g., real-time processing), is also relevant but is addressed via straightforward extension of the principles to be discussed. A final step 45 is to determine the "optimal" number of regions using as input the information obtained in step one.

There are several measures of capacity which prove useful. Denote the number of switches in a network by $N_s$, the number of Adjuncts by $N_A$, and the total number of intertoll trunks by T. The average switch to switch intertoll capacity, $<T_s>$, is given by $<T_s>=T*N_s*(N_s-1)/2$; as will be seen, this parameter is useful in that it sets the scale for further architecture design decisions. Next consider dividing the network into R regions.

In general, these regions are not required to be of equal capacity nor even have an equivalent topology. However, for operational simplicity it is assumed that regions are chosen so that they are of roughly equal capacity and topology. By extension, the average switch to switch intertoll capacity within a region is given by $<T_s>_R=T_R*N_{sR}*(N_{sR}-1)/2$. The switch-to-switch load for existing traffic between two switches m and n will be denoted by $L_{mn}$, ABS traffic between the OAS and TAS A will be denoted by $A_{mn}$ and between TAS A and TAS B will be denoted by $B_{mn}$. The number of intertoll trunks between two switches m and n is denoted by $T_{mn}$. Determination of $<T_s>$, $L_{mn}$, $A_{mn}$, and $B_{mn}$ completes the first steps (boxes 39, 41, 43); these parameters are input for the next step (box 45).

The next step is to determine the number of regions (box 45) and the set of switches and adjuncts which reside in each region (boxes 46, 47). In other words, what is the "optimal" value for R and which of the Ns/R out of $N_s$ switches reside in a given region. The value of R is principally driven by three things: geographic "community of interest" effects, the ratio $N_S/N_A$, and the number of customer groups.

The central idea behind the community of interest effect is to note that $L_{mn}$, $A_{mn}$, and $B_{mn}$ are very strongly dependent on airmile distance. In a statistical sense, as the airmile separation between switch m and switch n increases, load (number of calls*call holding time) decreases. The background network trunking will therefore be designed with very large trunk groups $T_{mn}$ between two close switches m and n. So, the larger that R is the larger the usage and trunking. This fact taken by itself drives the number of regions to be large (in fact equal to the number of switches).

The community of interest effect is balanced by the fact that almost universally $N_A \ll N_S$. ABS by their very nature are services deployed on adjuncts because the functionality provided by the adjunct is not available on the switch. Traffic volumes are those expected for niche markets and new services and thus require relatively fewer adjuncts to provide sufficient capacity. The methodology described herein is applicable when $N_A$ and $N_S$ are roughly equal, however the value of the approach is somewhat diminished.

The size of R is set by the ratio $N_S/N_A$. The optimal value of R is obtained by applying any of several well known optimization methodologies (e.g., a heuristic algorithm) to a "cost function" F. F is a function of $T_{mn}$, $L_{mn}$, $A_{mn}$, $B_{mn}$ and R. This optimization process yields not only the value of R but also the optimal set of geographically "near" switches that logically comprises a region R. It should be noted that it is not unreasonable for $<T_s>_R$ (obtained by fixing the switches per region) to be an order of magnitude larger than $<T_s>$. As is well known from traffic theory, these larger trunk groups are much more efficient than smaller subgroups.

Adjunct-Switch Routing Topology

The Adjunct-Switch Routing topology is based on which customer group the call belongs to, the region of origination, and the specific values provisioned in the MRT tables. Routing based on customer group (one or more SSC codes) and region of origination are the key points underlying the present invention architecture. This is a substantial deviation from the prior art which was solely based on an ARN as discussed earlier. Key topological aspects of the present invention architecture includes homing of traffic from multiple regions to a given adjunct site and the ability to uniquely identify, under normal conditions, which specific adjunct receives traffic from a given customer group within a region.

An effective number of customer groups needs to be determined. The number of customer groups is related to the number of regions as well as details of the customer makeup for the ABS service. The customer makeup comes into play especially for 800 ABS. This is because there may be very large customers in common industries that are highly media or advertising stimulated (e.g., airline industry). It is prudent to take this detail into account when choosing the number of customer groups so that large customers in common industries can be assigned to separate groups. With this qualification, the number of customer groups $N_{CG}$ is roughly given by $N_{CG}=2N_A/R$; this relationship should be considered a heuristic and may vary slightly depending on the specific implementation. To perform routing based on customer group in the present invention architecture the ARN (SSC-AAA-XXXX) was reused. The interpretation of the SSC is substantially different than in the prior art. In the present invention architecture the SSC code is not correlated with an adjunct site, but rather represents a set of customers.

It is quite common for 800 ABS to have large fluctuations in traffic volume not only on a national scale but also regionally. The present invention architecture provides stability under regional congestion by requiring that any given adjunct receive traffic from at least 2 regions (and in some cases 3). Receiving traffic from a larger number of regions makes the architecture less efficient because of loss of community of interest benefits.

Many of the key advantages of the present invention architecture results from its distributed nature. One of the key drivers for prior art architectures is that there must be a simple method to troubleshoot customer complaints. In fact, a key advantage of the prior SSA architecture is that there was a direct mapping between SSC code and adjunct site; any trouble could be immediately associated with a specific site. This capability is not compromised in the present invention Architecture. This is seen in the sample MRT table 90 provided in FIG. 8. For a specific customer group and a specific originating region the adjunct that the traffic is homed to is unique.

Figure 5:
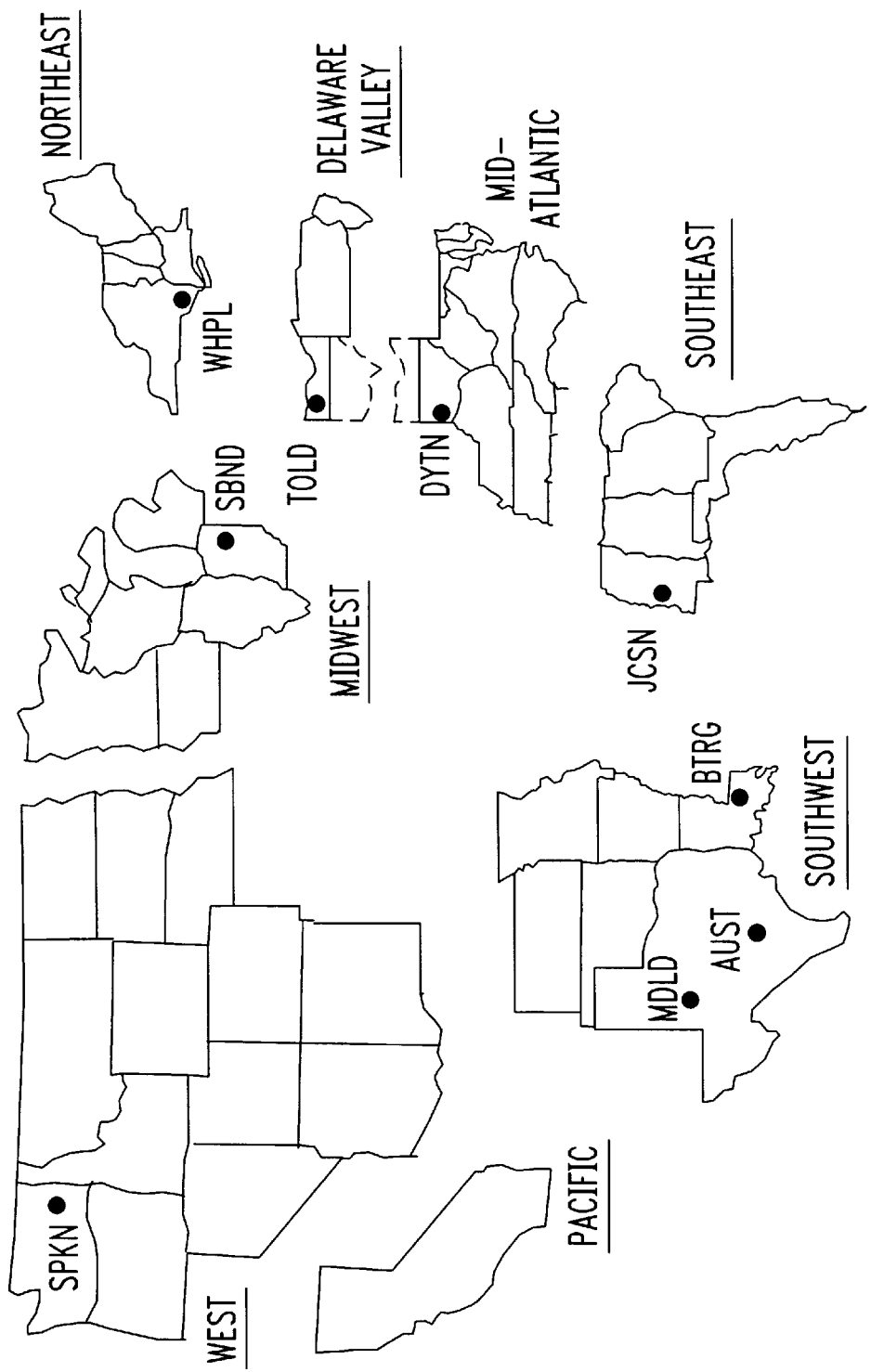
FIG. 5 shows an exemplary "optimal" partitioning of a domestic long distance network into optimal regions in accordance with the present invention, included are locations for some of the adjuncts which comprise the adjunct based network.

In an advantageous embodiment of the present invention shown in FIG. 5, a switched communications network 100 including the continental United States is divided into 8 geographic regions according to the criteria previously discussed. The originating traffic from each region homes to 3 adjunct sites. Each adjunct receives traffic from two unique regions and originating 800 calls are approximately evenly distributed among the 8 regions. In addition, each customer group (three SSCs (ARNs) ) is mapped to a unique MRT table at all originating switch locations OASs within a specified region. All MRT tables are provisioned with an optimum adjunct and seven back-up adjuncts, wherein route choice #1 is the desired choice 100% of the time and route choices 2–8 are desirable 0% of the time, as will be explained.

Referring to FIG. 7, there is shown an exemplary MRT Table 60 provisioned according to the present routing strategy. The MRT Table contains the primary adjunct route choice and the overflow route choices. The MRT capability allows a call to be routed to the primary adjunct site, and in the event of the call can't be completed to the primary adjunct site due to network failure or adjunct failure, the call is cranked back to the OAS and the next route choice is selected. The MRT Table 60 has three fields; the PCT 62, the Call Type 64, and the Call Data 66. The PCT field 62 indicates the percentage of calls to apply a given treatment to as a first choice. In the shown embodiment of the MRT Table, 100% of the calls would receive first choice routing and 0% of the calls would receive other treatments. Valid entries are from 0 to 100. The Call Type field 64 indicates the routing treatment and the Call Data field 66 indicates the data associated with the routing treatment. The network switches utilize the information in the MRT Table to route calls through the network.

As can be seen, the present invention is different from the prior art in that the present invention architecture provides a method to design a cost effective, stable, reliable, and maintainable architecture in which disadvantages of the prior art are eliminated. This is achieved via a straightforward methodology which is based on two simple principles.

Figure 8:
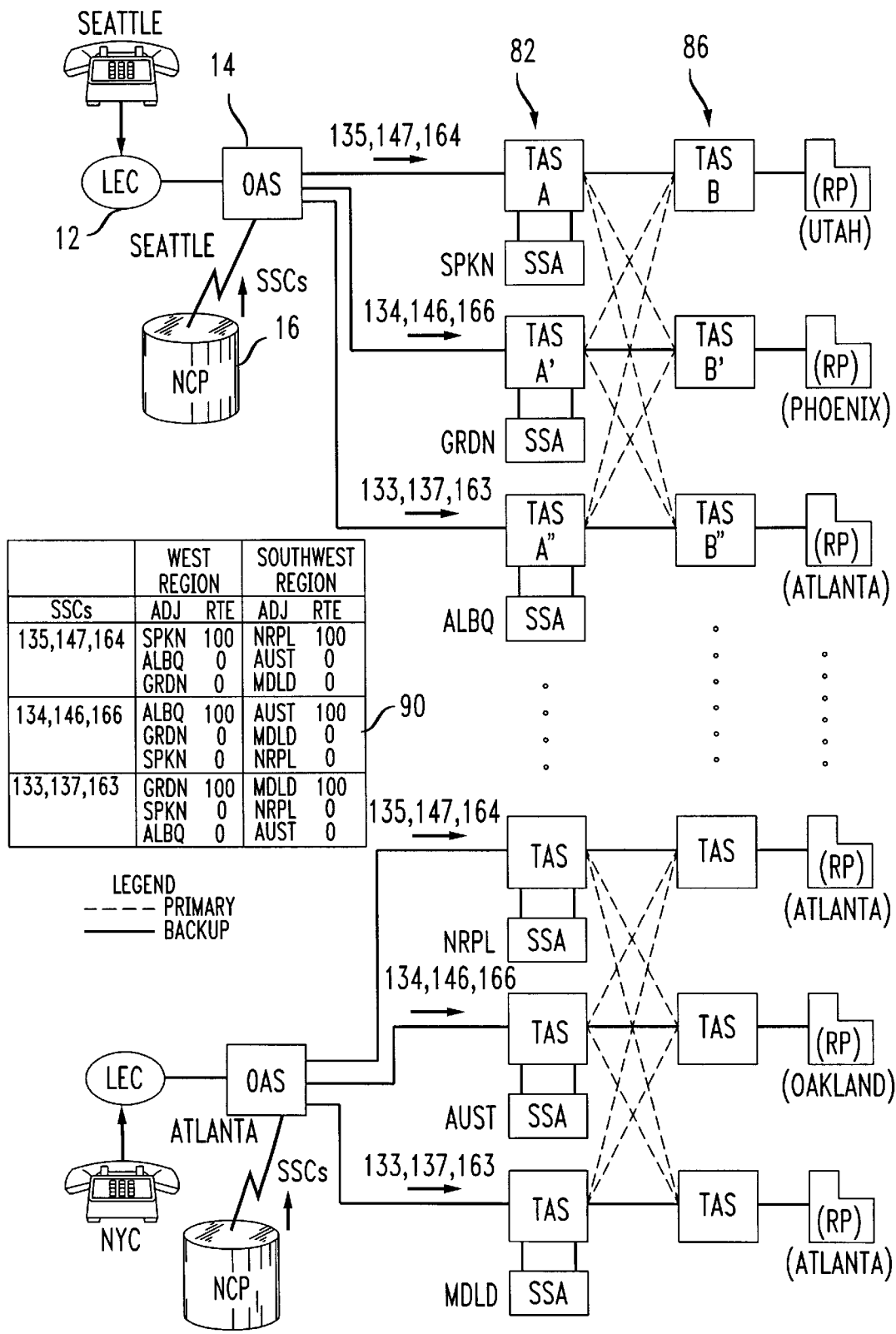
FIG. 8 shows an exemplary call flow in accordance with the present invention STAR architecture.

Referring to FIG. 8, it can be seen that the present invention architecture routes originating traffic from a local exchange carrier 12 based on customer group and geographic origin. High community of interest between OAS 14 and TAS A 82 switches results in more efficient trunking and thus a reduction in capital cost associated with intertoll trunking. On the TAS A 82–TAS B 86 leg of a call all traffic arriving at a given TAS B switch does not arrive from a single TAS A. Between any TAS A–TAS B pair the load is reduced by a factor 1/R from the prior art.

The present invention architecture is stable under reasonable fluctuations of customer traffic. Consider an adjunct engineered to a load of X utilization of which a large customer uses (w/R)X of the total capacity. Note that the total network load for the customer would be R*(w/R)X= wX. If, as a result of media stimulated calling by that particular customer, the network load increases to double the normal load, the impact is distributed across R different adjuncts. Specifically the load on a given adjunct would increase from X to (1+w/R)X; for w=0.5 and R=10 regions this results in only a 5% increase over the engineered traffic load. A similar effect occurs for customer perceived reliability. If a single adjunct site is experiencing problems only 1/R of a given customers traffic is impacted (notice that the trade off is that more customers are impacted, as compared to the prior art, but only in a small way.)

Another advantage of the present invention architecture is that very few SSCs are required (one per customer group). New adjuncts can be deployed without requiring the provisioning of a new SSC; thus, this limited resource can be conserved.

FIG. 6A illustrates two key deficiencies of the prior art. First, as shown in graph 200 traffic loads among different adjuncts are very uneven. This is the result of having a single SSC assigned to a single switch; the architecture does not "naturally" accommodate for under- or over-forecasting of traffic volumes. Secondly, it is clear that a daily fluctuation in traffic (e.g., at SBNDIN) will potentially place the adjunct in overload.

FIG. 6B illustrate the same traffic load 210 distributed via the network architecture of the present invention. The distributed nature of the architecture "naturally" balances traffic across the nine adjuncts. Note that the traffic volume of any single customer group is only roughly ⅑ of the total load. A doubling of traffic load for a single customer group results in a slight (≈10%) increase in the total load for the adjunct.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method for routing calls in a communications network, said method comprising the steps of:
   receiving a call at an originating switch of said communications network, the call originating from a caller who is not a member of a customer group, the caller placing the call to a called party that is a member of the customer group;
   referencing a routing table to determine routing and an associated adjunct site for said call, said routing and said adjunct site determination being based on geographic origin of the originating caller and the customer group; and
   routing said call to said adjunct site based jointly on said geographic origin and the customer group.

2. The method of claim 1, wherein said adjunct sites are coupled to switches in said communications network, further including the step of accessing a database prior to said step of referencing a routing table to thereby determine whether said call is an adjunct based call destined for one of said adjunct sites.

3. The method of claim 2, wherein said customer group for said call is indicated during said step of accessing a database, said customer group being identifiable from a called number.

4. The method of claim 2, wherein said communications network is divided into a plurality of geographic regions, each of said adjunct sites receiving adjunct based calls from at least two of said geographic regions.

5. The method of claim 4, wherein each said customer group is mapped to a unique routing table at originating switch locations within a specified one of said geographic regions.

6. The method of claim 4, wherein said geographic regions are determined according to a ratio of number of switches to number of adjuncts and number of customer groups, the ratio being other than one-to-one.

7. The method of claim 6, wherein said geographic regions are further determined according to geographic community of interest.

8. The method of claim 1, wherein a customer group is represented as one or more special service codes, the special service code being defined as a part of an adjunct routing number.

9. The method of claim 1, wherein a customer group represents a set of customers having adjunct based services.

10. The method of claim 1, wherein said step of routing is performed according to a cost function.

11. The method of claim 10, wherein said cost function is a function of the number of intertoll trunks between two switches, switch to switch load between two switches, adjunct based traffic between an originating switch and an destination switch and adjunct based traffic between a first destination switch to a second destination switch.

12. The method of claim 2, further including the step of referencing a routing table at a destination switch to thereby direct said call to an adjunct site coupled thereto.

13. The method of claim 1 for routing calls in a communications network, said network further consisting of a number of regions R, a number of customer groups $N_{CG}$, and a number of adjuncts $N_A$, said routing step further comprising the step of:
   determining the number of customer groups $N_{CG}=2N_A/R$.

14. A method for routing adjunct based calls to adjunct sites in a communications network, wherein said adjunct sites are coupled to terminating switches in said network, said method comprising the steps of:
   receiving an adjunct based call at an originating switch of said communications network, the call originating from a caller who is not a member of a customer group, the caller placing the call to a called party that is a member of the customer group;
   accessing a customer database to determine said customer group for said adjunct based call;
   referencing a routing table to determine routing of said adjunct based call to one of said adjunct sites; and
   routing said adjunct based call to an adjunct site based jointly on geographic origin of the originating call and said customer group.

15. The method of claim 14, wherein said communications network is divided into a plurality of geographic regions, each of said adjunct sites receiving adjunct based calls from at least two of said geographic regions.

16. The method of claim 15, wherein each said customer group is mapped to a unique routing table at originating switch locations within a specified one of said geographic regions.

17. The method of claim 14, wherein said adjunct based call is able to be routed between a first terminating switch and second terminating switch in said network.

18. The method of claim 14, further including the step of referencing a routing table at said terminating switch to thereby direct said adjunct based call to an adjunct site coupled to said terminating switch.

19. The method of claim 14 for routing adjunct based calls in a communications network, said network further consisting of a number of regions R, a number of customer groups $N_{CG}$, and a number of adjuncts $N_A$, said routing step further comprising the step of:

determining the number of customer groups $N_{CG}=2N_A/R$.

20. A system for routing adjunct based calls in a communications network to adjunct sites, said adjunct sites being coupled to terminating switches in said network, said system comprising:

an originating switch for receiving an adjunct based call, the call originating from a caller who is not a member of a customer group, the caller placing the call to a called party that is a member of the customer group, wherein the called party subscribes to services of a communications network provider;

a database accessible by said originating switch for storing the customer group corresponding to said adjunct based call;

a routing table for storing identification of an adjunct site for routing of said adjunct based call, said identification of said adjunct site based on both a geographic origin of the originating caller and said customer group of said adjunct based call; and means for routing said adjunct based call based on said identification at said routing table.

21. The system of claim 20, wherein said communications network is divided into a plurality of geographic regions, each of said adjunct sites adapted to receive adjunct based calls from at least two of said geographic regions.

22. The system of claim 21, wherein each said customer group is mapped to a unique routing table at originating switches within a specified one of said geographic regions.

23. The system of claim 21, wherein said geographic regions are determined according to geographic community of interest, ratio of number of switches to number of adjuncts and number of customer groups, the ratio being other than one-to-one.

24. The system of claim 20, wherein said routing table includes at least one primary route choice and at least one overflow route choice for routing said communications traffic.

25. The system of claim 20, wherein said routing table includes a call data field indicative of the routing treatment for a call, a second call data field including data associated with said routing treatment for said call and a percentage field indicative of a percentage of calls to apply to a given routing treatment.

26. The system of claim 20, wherein a customer group is represented as one or more special service codes, the special service code being defined as a part of an adjunct routing number.

27. The system of claim 20, wherein a customer group represents a set of customers having adjunct based services.

28. The system of claim 20, wherein at least one of said adjunct sites is adapted to receive adjunct based calls from more than one of said geographic regions.

29. The system of claim 20, wherein said routing table is adapted to route adjunct based calls to a unique adjunct for a specific customer group and a specific originating region.

30. The system of claim 20, wherein adjunct based traffic may be routed between a first terminating switch and second terminating switch in said network.

31. The system of claim 20 for routing adjunct based calls in a communications network, the network further consisting of a number of regions R, a number of customer groups $N_{CG}$, and a number of adjuncts $N_A$, where $N_{CG}=2N_A/R$.

* * * * *